(12) United States Patent
Nibe (10) Patent No.: US 7,496,335 B2
(45) Date of Patent: Feb. 24, 2009

(54) MOBILE TERMINAL APPARATUS AND CHANNEL COMPENSATION METHOD OF THE SAME

(75) Inventor: Keiji Nibe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 491 days.

(21) Appl. No.: 11/374,181

(22) Filed: Mar. 14, 2006

(65) Prior Publication Data

US 2007/0149149 A1 Jun. 28, 2007

(30) Foreign Application Priority Data

Dec. 28, 2005 (JP) ............................. 2005-377242

(51) Int. Cl.
*H03C 1/62* (2006.01)
(52) U.S. Cl. .................... 455/115.1; 370/206; 375/260
(58) Field of Classification Search ............. 455/67.13, 455/67.15, 115.1, 234.1; 370/206, 208, 260, 370/337, 342, 343, 491; 375/139, 148, 260, 375/338, 346
See application file for complete search history.

(56) References Cited

FOREIGN PATENT DOCUMENTS

EP          1 388 964 A1    2/2004
EP          1 596 522 A2    11/2005
JP          2004-248196     9/2004

OTHER PUBLICATIONS

3GPP: "ETSI TS 125 308 V5.3.0: Universal Mobile Telecommunication System (UMTS)" ETSI TS 125 308 V5.3.0, Dec. 2002, pp. 1-31, XP002236316.

*Primary Examiner*—Sam Bhattacharya
(74) *Attorney, Agent, or Firm*—Hanify & King, P.C.

(57) ABSTRACT

A mobile terminal apparatus includes a channel compensation processor configured to carry out a channel compensation process on a first channel reception signal using a channel estimation value obtained for the first channel based on a plurality of known signals received from a base station; and a channel re-compensation processor to carry out a channel compensation process again on the first channel with a channel estimation value of the first channel obtained based on a plurality of known signals including at least a known signal which is received after reception of the first channel when a decoding result of the first channel reception signal after the channel compensation process by the processor is defined as an error. With this, error rate of the first channel is reduced and the number of retransmission according to HARQ is reduced, so that throughput in the mobile terminal can be improved.

16 Claims, 9 Drawing Sheets

MOBILE TERMINAL APPARATUS AND CHANNEL COMPENSATION METHOD OF THE SAME

CROSS REFERENCE TO RELATED APPLICATIONS

This application is based on and hereby claims priority to Japanese Application No. 2005-377242 filed on Dec. 28, 2005 in Japan, the contents of which are hereby incorporated by reference.

BACKGROUND OF THE INVENTION (1) Field of the Invention

The present invention relates to a mobile terminal apparatus and a channel compensation method of the mobile terminal apparatus. The present invention relates to, for example, a preferable art employed in an apparatus for communicating by an HSDPA (High Speed Downlink Packet Access) transmission system, which is one of radio mobile terminal transmission systems and having a function to temporarily store information to be discarded and decode by using both of stored information and retransmitted information.

(2) Description of Related Art

An HSDPA for providing the maximum transmission rate of 14 Mbps in downlink communications from a base station to a mobile terminal is currently specified in the 3GPP (the $3^{rd}$ Generation Partnership Project) as a theme of standardization of W-CDMA (Wideband-Code Division Multiple Access) system, which is one of the third generation mobile communication systems.

The HSDPA transmission system is an art for changing the number of multicodes, a modulating system (such as QPSK or 16QAM), a transmission block size (TBS: Transport Block Size) or the like of an HS-PDSCH (High Speed-Physical Downlink Shared Channel), which will be described later, according to a reception environment of a mobile terminal in order to select the most appropriate transmission rate and perform communications.

The HSDPA employs an adaptive coding modulation system and, for example, it is characterized by adaptively switching the QPSK modulation system and 16QAM system according to a radio environment between a base station and a mobile terminal.

The HSDPA system employs a retransmission control system called HARQ (Hybrid Automatic Repeat reQuest). In the HARQ system, when a mobile terminal detects an error in data received from the base station, the mobile terminal requests the base station to retransmit the data. Accordingly, the data is retransmitted from the base station. The mobile terminal carries out an error correction decoding in use of both the previously received data and the retransmitted reception data. In the HARQ system, effective utilization of the previous reception data increases a gain of the error correction decoding and reduces the number of retransmission.

As major radio channels employed in the HSDPA, there are HS-SCCH (High Speed-Shared Control Channel), HS-PDSCH (High Speed-Physical Downlink Shared Channel), and HS-DPCCH (High Speed-Dedicated Physical Control Channel).

Both of the HS-SCCH and the HS-PDSCH are downlink shared channels and the HS-SCCH is a control channel for transmitting various parameters related to data transmitted by the HS-PDSCH. The parameters includes, for example, modulating type information indicating which modulation system is employed to transmit data by the HS-PDSCH, the number of allocation of spread coding (the number of codes), or patterns of rate matching processes performed on transmission data.

On the other hand, the HS-DPCCH is an uplink dedicated control channel for communication from the mobile terminal to the base station. The HS-DPCCH is used when the mobile terminal transmits ACK signal and NACK signal to the base station according to a result of data reception of HS-PDSCH. When the mobile terminal fails to receive data (for example, CRC error in the received data), NACK signal is transmitted from the mobile terminal, so that the base station carries out retransmission control. When the CRC error occurs in HS-SCCH, HS-PDSCH cannot be correctly decoded and DTX signal, which indicates that HS-PDSCH addressed to the mobile terminal itself is not received, is transmitted to the base station. In this case, the base station retransmits the same data.

Further, the HS-DPCCH is used also when the mobile terminal measures reception quality (for example, SIR: Signal Interference Ratio) of the signal received from the base station and periodically transmits the result to the base station as CQI (see FIG. 4). The base station determines a condition of the downlink radio environment based on the received CQI. When the environment is good, the base station may switch to a modulation system for higher data transmission rate and when the environment is not good, the base station adaptively switches to a modulation system for lower data transmission rate.

(Channel Structure)

Next, a channel structure of the HSDPA will be described.

Figure 4:
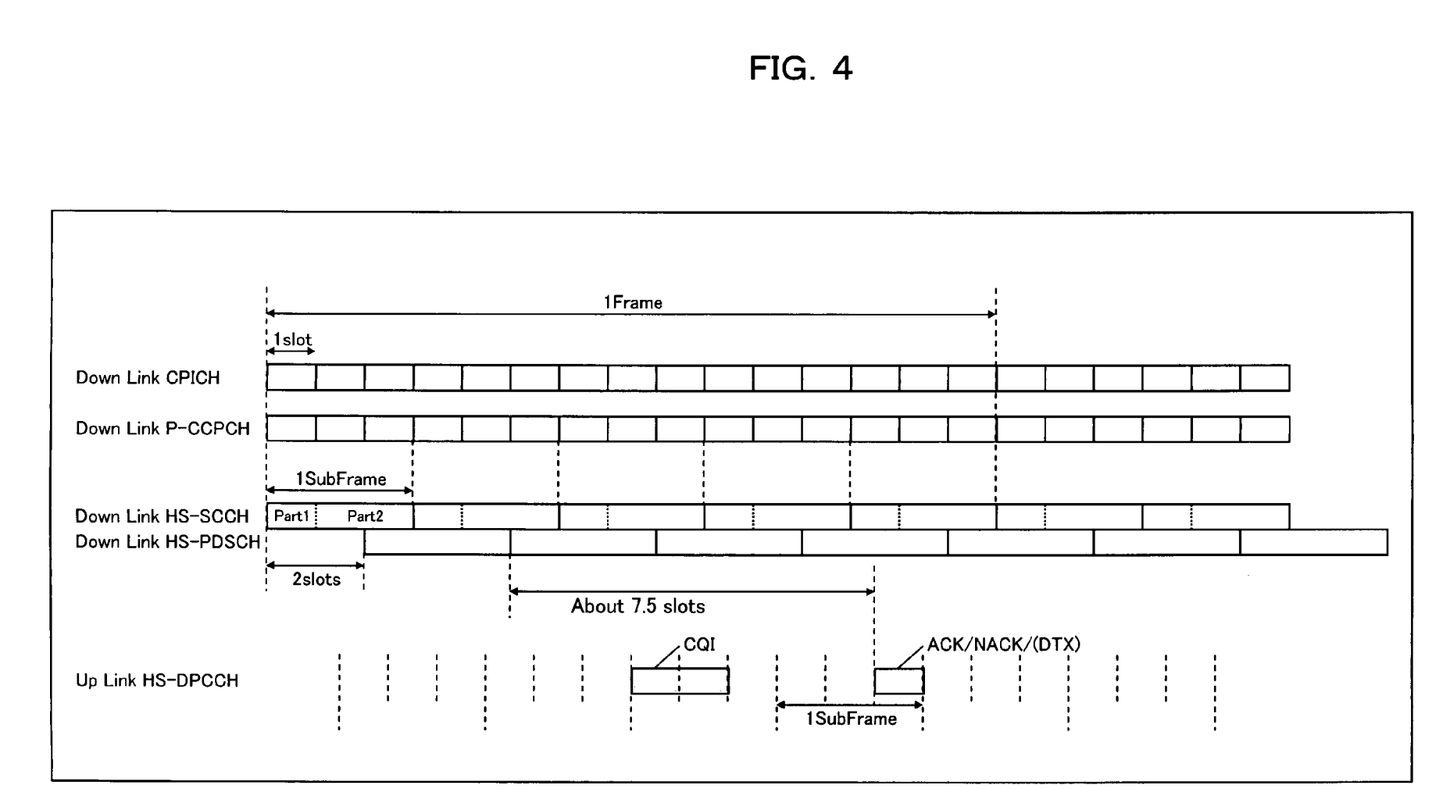
FIG. 4 is a diagram showing a channel structure in the HSDPA.

FIG. 4 is a diagram showing a channel structure of HSDPA. It is noted that, in the W-CDMA system, each channel is separated by coding to be adapted to a code division multiplex system.

Firstly, channels, which are yet to be described among the channels shown in FIG. 4, will be described.

A CPICH (Common Pilot Channel) and a P-CCPCH (Primary Common Control Physical Channel) are respectively downlink shared channels. The CPICH is a channel used for channel estimation, cell search, and a timing basis of other downlink physical channels in the same cell and used to transmit so-called pilot signals (known signals between the base station and the mobile terminal). The P-CCPCH is a channel for transmitting broadcasting information.

Next, timing relationship in each channel will be described.

As shown in FIG. 4, each channel includes a frame (10 ms) that is composed of 15 slots. As described above, the CPICH is used as a basis of other channels and the beginning of frame of the P-CCPCH is respectively corresponding to the beginning of frame in the HS-SCCH. Here, the beginning of frame of the HS-PDSCH is delayed by 2 slots with respect to that of HS-SCCH. This delay is provided in order to notify, in advance, modulating type information or spread code information, which are required for demodulating the HS-PDSCH in the mobile terminal.

Accordingly, the mobile terminal performs HS-PDSCH demodulation or the like by selecting the corresponding demodulating system and despreading code according to the notified information via the HS-SCCH. Further, the HS-SCCH and the HS-PDSCH include a sub-frame composed of 3 slots. The foregoing is the brief descriptions of the HSDPA channel structure.

(Structure of Mobile Terminal)

Figure 5:
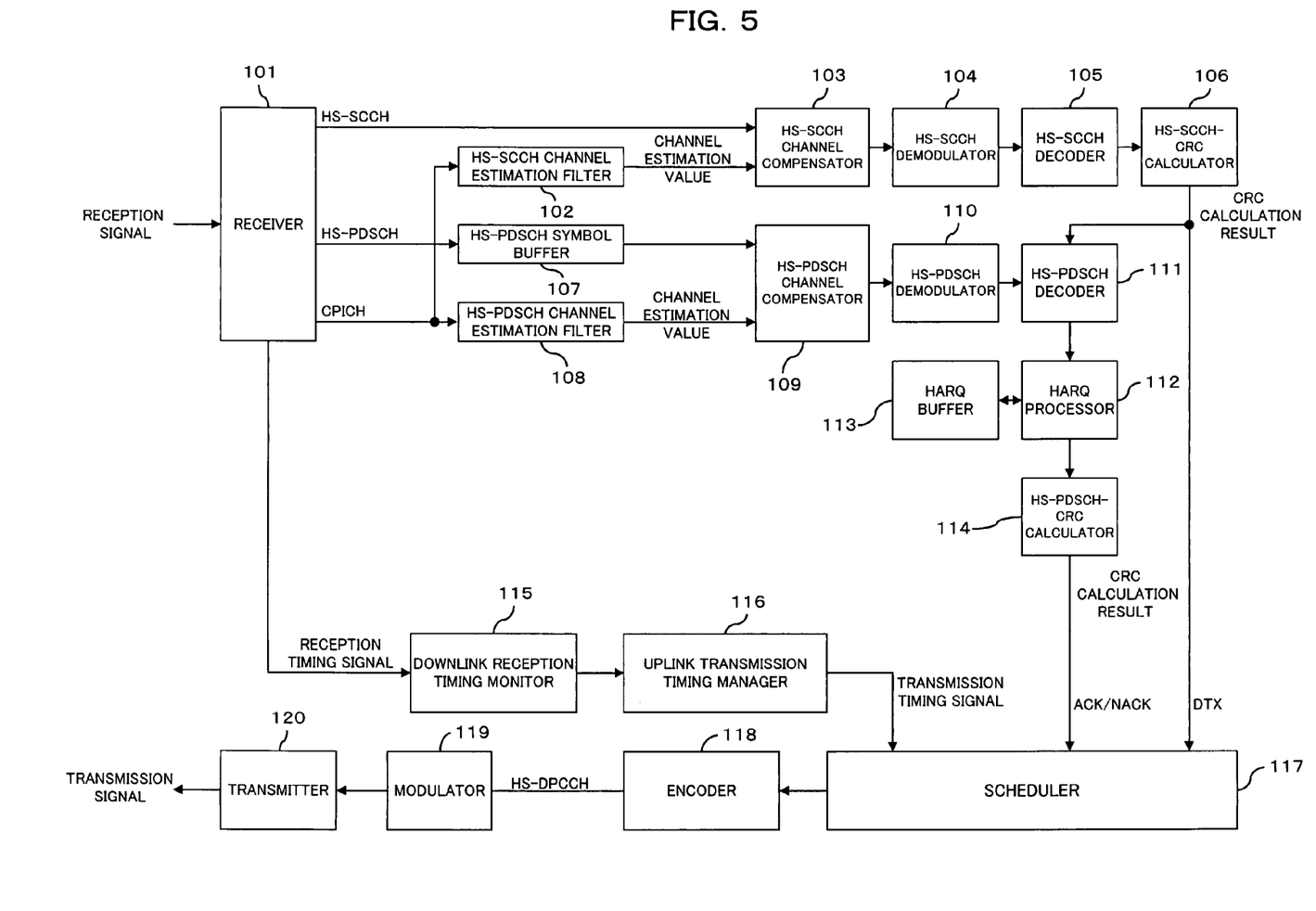
FIG. 5 is a functional block diagram showing a structure of a relevant part of a known mobile terminal adapted to the HSDPA.

FIG. 5 is a diagram showing a structure of a relevant part of a known mobile terminal adapted to the HSDPA. The mobile terminal shown in FIG. 5 includes, for example, a receiver 101, an HS-SCCH channel estimation filter 102, an HS-SCCH channel compensator 103, an HS-SCCH demodulator 104, an HS-SCCH decoder 105, an HS-SCCH-CRC calculator 106, an HS-PDSCH symbol buffer 107, an HS-PDSCH channel estimation filter 108, an HS-PDSCH channel compensator 109, an HS-PDSCH demodulator 110, an HS-PDSCH decoder 111, a retransmitting (HARQ) processor 112, a retransmitting (HARQ) buffer 113, an HS-PDSCH-CRC calculator 114, a downlink reception timing monitor 115, an uplink transmission timing manager 116, a scheduler 117, an encoder 118, a modulator 119, and a transmitter 120.

In the mobile terminal, a reception signal received by a reception antenna (not shown) is input into the receiver 101. The receiver 101 performs processes such as path detection or despreading for downlink and separates each channel of CPICH, HS-SCCH, and HS-PDSCH. The separated CPICH is input into the HS-SCCH channel estimation filter 102 and the HS-PDSCH cannel estimation filter 108, respectively.

The HS-SCCH channel estimation filter 102 and the HS-PDSCH channel estimation filter 108 calculate channel estimation values of HS-SCCH and HS-PDSCH respectively according to the pilot signals received via CPICH.

On the HS-SCCH which is separated in the receiver 101, the HS-SCCH channel compensator 103 carries out channel compensation for HS-SCCH in use of a channel estimation value obtained in the HS-SCCH channel estimation filter 102, the HS-SCCH demodulator 104 carries out demodulation, the HS-SCCH decoder 105 carries out decoding and the HS-SCCH-CRC calculator 106 carries out CRC calculation. Since the information whose CRC is determined as OK in the HS-SCCH-CRC calculator 106 includes, as described above, information required for HS-PDSCH decoding such as modulating type information and spread code information, it is provided to the HS-PDSCH decoder 111. Here, when the result of HS-SCCH-CRC calculation is NG, an error (DTX) is notified to the scheduler 117.

On the other hand, the HS-PDSCH which is separated in the receiver 101 is firstly buffered and delayed in the HS-PDSCH symbol buffer 107. Then, the HS-PDSCH channel compensator 109 carries out channel compensation in use of the channel estimation value obtained in the HS-PDSCH channel estimation filter 108 and the HS-PDSCH demodulator 110 carries out demodulation. Further, the HS-PDSCH decoder 111 decodes in use of necessary information for HS-PDSCH decoding obtained in the HS-SCCH-CRC calculator 106.

Here, as described later with reference to FIG. 7, the HS-PDSCH symbol is delayed in the HS-PDSCH symbol buffer 107 because it is preferable to use a channel estimation value that is calculated by averaging CPICH symbols of a plurality of past and future slots with respect to a target HS-PDSCH slot (symbol) of the demodulation.

The HS-PDSCH symbol which is decoded by the HS-PDSCH decoder 111 is input into the HARQ processor 112 and accordingly stored in the HARQ buffer 113 in preparation for retransmission combining process based on HARQ. Accordingly, when retransmitting, the HARQ processor 112 combines the previously received HS-PDSCH symbol stored in the HARQ buffer 113 and the retransmitted HS-PDSCH symbol to input into the HS-PDSCH-CRC calculator 114.

The HS-PDSCH-CRC calculator 114 carries out CRC calculation on the HS-PDSCH symbol from the HARQ processor 112. Then, when the result is OK, ACK signal is transmitted to the scheduler 117 and when the result is NG, NACK signal is transmitted to the scheduler 117, respectively as calculation results.

The scheduler 117 schedules DTX from the HS-SCCH-CRC calculator 106, and ACK/NACK from the HS-PDSCH-CRC calculator 114, respectively, in accordance with the transmission timing signal from the uplink transmission timing manager 116. That is, as shown in the last line in FIG. 4, the scheduler 117 schedules so that ACK/NACK(/DTX) are respectively transmitted 7.5 slots later from the reception of HS-PDSCH. Here, the reception of HS-PDSCH is monitored by the downlink reception timing monitor 115.

On each information scheduled as described above, the encoder 118 encodes as HS-DPCCH data and the modulator 119 modulates. Then, the transmitter 120 transmits that information to the base station via HS-DPCCH. The base station transmits new data when receiving ACK, retransmits HS-SCCH and HS-PDSCH when receiving DTX, and retransmits HS-PDSCH when receiving NACK.

(HARQ Processing Flow)

Figure 6:
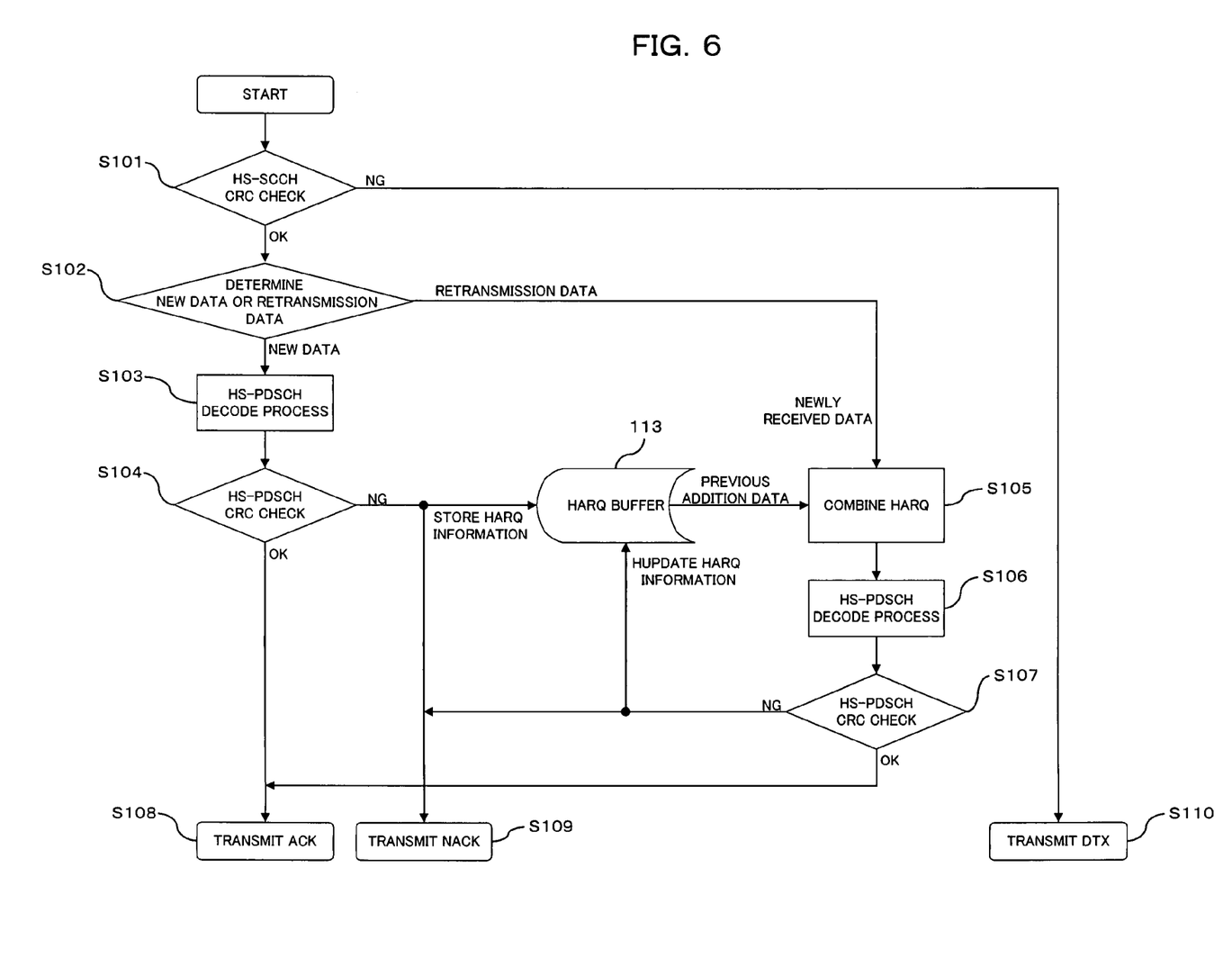
FIG. 6 is a flowchart showing an HARQ operation in the mobile terminal of FIG. 5.

Next, an HARQ processing flow according to the known art will be described below with reference to FIG. 6.

As described above, after the HS-SCCH decoding, the mobile terminal transmits DTX to the base station when the result of CRC calculation of HS-SCCH is NG (from NG route in step S101 to step S110) and determines whether or not it is new data or retransmission data when the result of CRC calculation of HS-SCCH is OK (from OK route in step S101 to step S102).

When it is determined as new data, HS-PDSCH CRC calculation is carried out after HS-PDSCH decoding (from 'new data' route in step S102 to step S103, and step S104). When the result of the CRC calculation is OK, ACK is transmitted to the base station (from OK route in step S103 to step S108). When the result of CRC calculation is NG, NACK is transmitted to the base station (from NG route in step S104 to step S109) and HARQ information is stored in the HARQ buffer 113.

On the other hand, when it is determined as retransmission data in the step S102, the HARQ processor 112 combines the received data and previous addition data stored in the HARQ buffer 113 (from 'retransmission data' route in step S102 to step S105). After the HS-PDSCH decoding, HS-PDSCH CRC calculation is carried out (steps S106 and S107). ACK is transmitted to the base station when the CRC calculation result is OK (from OK route in step S107 to step S108) and NACK is transmitted again to the base station when the CRC calculation result is NG (from NG route in step S107 to step S109).

In this way, the mobile terminal carries out error correction decoding by using both of the previous reception data and the retransmitted reception data, so that a gain of the error correction decoding is increased and the number of retransmission is reduced.

There is an art proposed by Japanese Patent Application Laid-Open No. 2004-248196, which is related to the HSDPA system. Japanese Patent Application Laid-Open No. 2004-248196 discloses an art for selecting a high quality bit having good reception quality and combining the bit with a retransmission signal in order to improve reception characteristics of a data channel.

Figure 7:
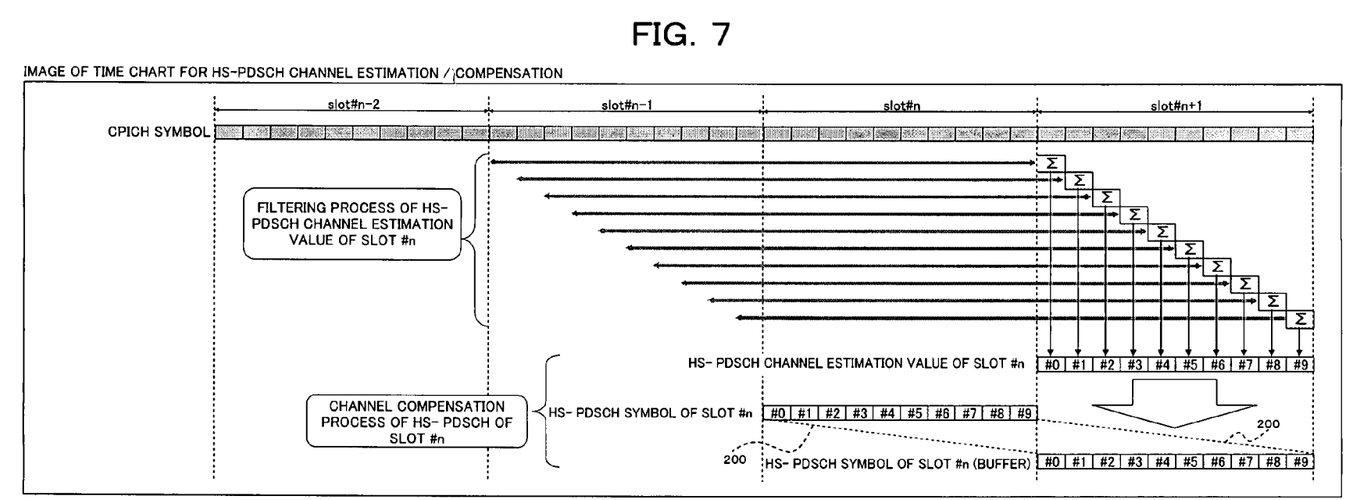
FIG. 7 is a diagram showing, by symbol unit, a time chart image of HS-PDSCH channel estimation/compensation in the mobile terminal of FIG. 5.
Figure 8:
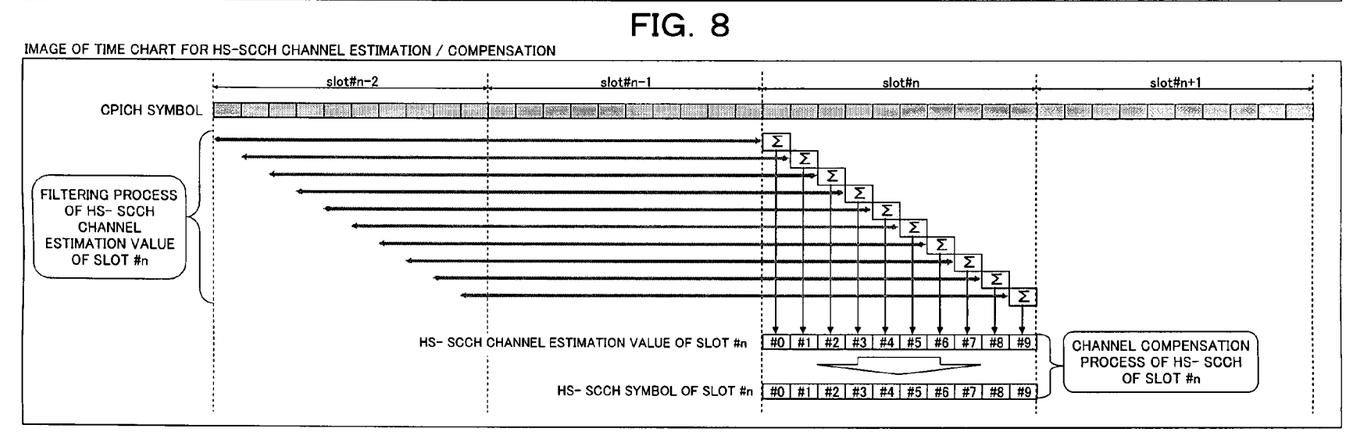
FIG. 8 is a diagram showing, by symbol unit, a time chart image of HS-SCCH channel estimation/compensation in the mobile terminal of FIG. 5.

FIG. 7 is a diagram showing a time chart image of HS-PDSCH channel estimation and compensation performed in the mobile terminal shown in FIG. 5 by symbol unit. FIG. 8 is a diagram showing a time chart image of HS-SCCH channel estimation and compensation performed in the mobile terminal shown in FIG. 5 by symbol unit. In FIGS. 7 and 8, the number of symbols in a single slot is defined as 10, from #0 to #9.

According to the HS-PDSCH modulation in the mobile terminal, in order to modulate a slot (for example, slot #n in FIG. 7), a channel estimation value which is appropriate to the time of slot #n is required to be calculated from CPICH symbol in order to carry out the modulation process on HS-PDSCH symbol. Accordingly, the channel estimation value which is appropriate to the time of slot #n (filtering process) is preferably calculated by averaging (each "Σ" in FIGS. 7 and 8 represents an averaging process) past and future CPICH symbols (slot #n−1 to slot #n+1), however, in this case, it gets to the time of slot #n+1 before the channel estimation process is completed.

Therefore, in the mobile terminal, as indicated by an arrow 200 in FIG. 7, the HS-PDSCH symbol buffer 107 delays HS-PDSCH symbol of slot #n and the modulation process is carried out at the time from slot #n+1 to slot #n+2.

Here, it is specified that, in the HSDPA, as described above, ACK/NACK signal is transmitted to the base station at 7.5 slots later from the completion of HS-PDSCH reception and HS-PDSCH is received at 2 slots later from the reception of HS-SCCH. In order to complete the HS-PDSCH decode process on a data signal transmitted by about 14 Mbps, which is the maximum throughput in the HSDPA, before the ACK/NACK(/DTX) transmission, information required for HS-PDSCH decoding (HS-PDSCH decode information) needs to be obtained by carrying out the HS-SCCH demodulation and decode processes within one slot.

Therefore, in order to demodulate a slot of HS-SCCH (for example, slot #n in FIG. 8), for example, it is preferable to carry out a modulation process by using a channel estimation value calculated from past and future CPICH symbols with respect to the reception symbol (for example, CPICH symbols from slot #n−1 to slot #n+1 in FIG. 8) while delaying an HS-SCCH reception signal by one slot (buffering process) similar to the demodulation process of HS-PDSCH. However, because of the above temporal restriction, the HS-SCCH reception symbol cannot be delayed (buffered).

Therefore, for demodulation of HS-SCCH on slot #n, a future CPICH symbol cannot be used and a demodulation process is carried out in use of a channel estimation value calculated from only past CPICH symbols (for example, CPICH symbols from slot #n−2 to slot #n).

In other words, in FIG. 7, focusing attention on symbol #0 of slot #n, channel estimation value filtering for symbol #0 of HS-PDSCH is carried out in use of CPICH symbols from the first CPICH symbol in the past slot #n−1 to the last CPICH symbol in the future slot #n. Accordingly, a channel estimation value can be calculated from past and future CPICH symbols (slot #n−1 to slot #n+1) with respect to the time of symbol #0 of HS-PDSCH.

As shown in FIG. 8, since channel estimation value filtering for symbol #0 in slot #n of HS-SCCH is needed to be carried out by the last CPICH symbol in past slot #n−1, the filtering (averaging process) is carried out in use of CPICH symbols from the first CPICH symbol in slot #n−2 to the last CPICH symbol in slot #n−1.

Therefore, since a channel estimation value with respect to the time of the first symbol in slot #n−1 of HS-SCCH (one slot prior to the time of symbol #0) is calculated, a channel estimation value which is not appropriate to the time of symbol #0 may be calculated in some reception environments. As a result, the reception quality of HS-SCCH is often lower than the reception quality of HS-PDSCH under an environment in which a channel estimation result may change within a short time because of high speed fading or the like and a past channel estimation value differs from a current channel estimation value.

As described above, in general, a channel having higher error tolerance is allocated to HS-SCCH than HS-PDSCH so that the reception quality is usually better in HS-SCCH than in HS-PDSCH. However, because of the temporal restriction in the demodulation process, only past CPICH symbols may be used for the channel estimation for HS-SCCH modulation. As a result, the relation of reception qualities of HS-SCCH and HA-PDSCH is reversed in some radio environments with high speed fading.

Figure 9:
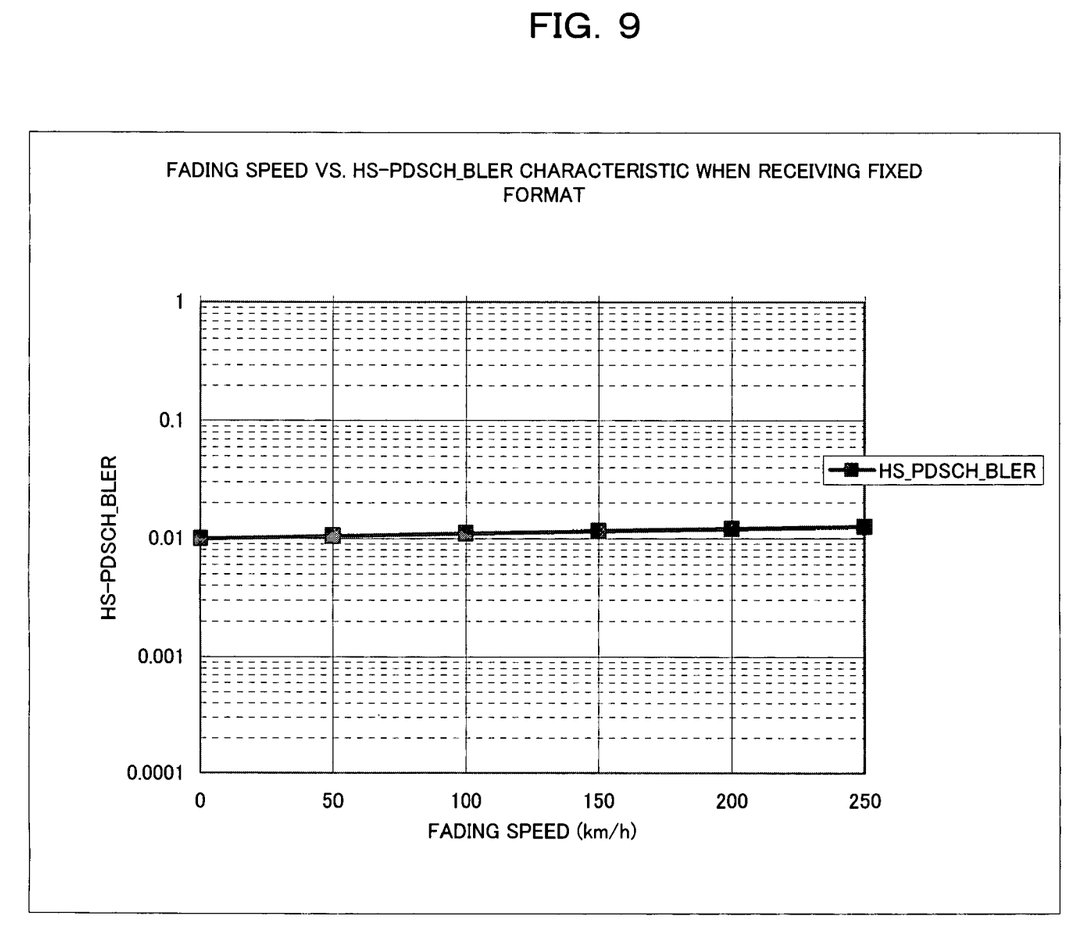
FIG. 9 is a graph quantitatively showing BLER characteristics of HS-PDSCH corresponding to a fading speed in the mobile terminal of FIG. 5, when a fixed format is received.
Figure 10:
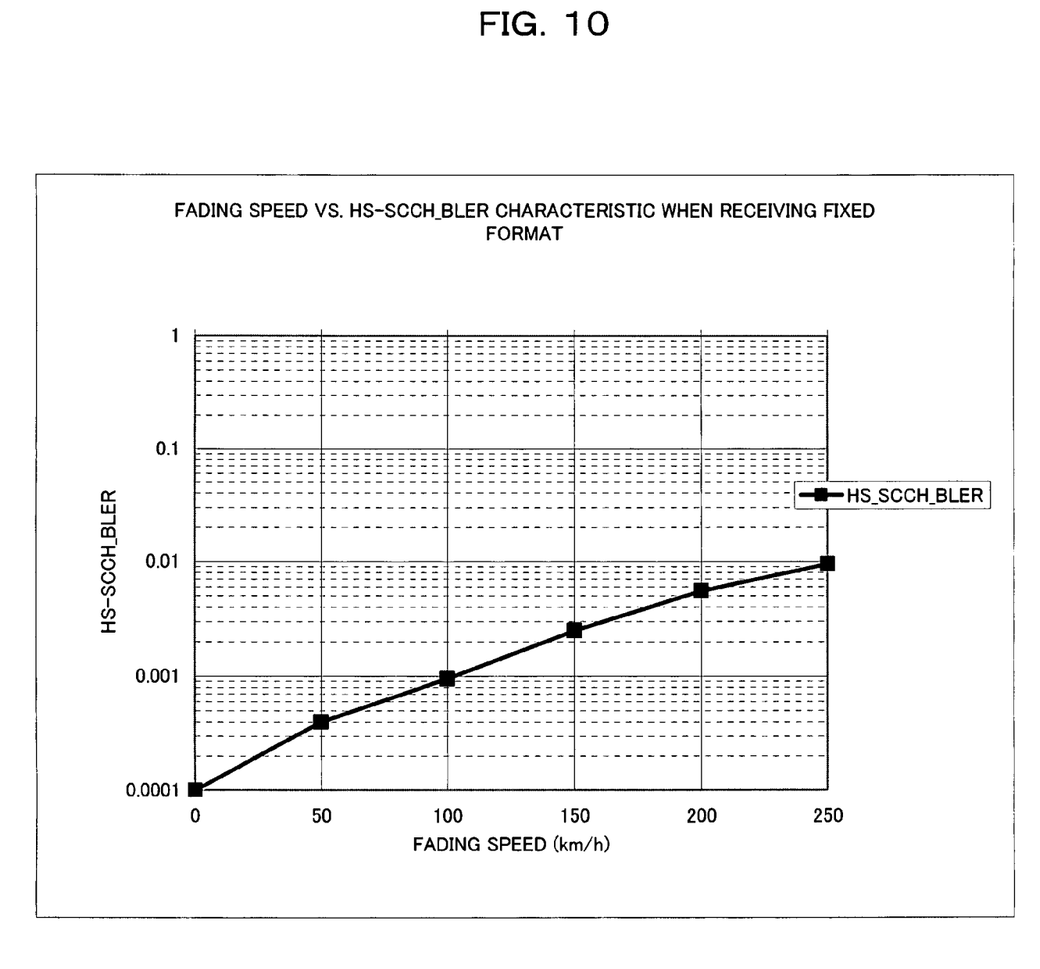
FIG. 10 is a graph quantitatively showing BLER characteristics of HS-SCCH corresponding to a fading speed in the mobile terminal of FIG. 5.

Such phenomenon will be explained with reference to FIGS. 9 and 10. FIG. 9 is a graph quantitatively showing HS-PDSCH BLER (Block Error Rate) characteristics when receiving a fixed format corresponding to a fading speed. FIG. 10 is a graph quantitatively showing HS-SCCH BLER characteristics corresponding to a fading speed.

As shown in FIG. 9, BLER of HS-PDSCH is substantially constant with respect to a fading speed; however, as shown in FIG. 10, BLER of HS-SCCH is deteriorated as the fading speed increases. In this manner, the reception quality of HS-SCCH tends to be deteriorated comparing to the reception quality of HS-PDSCH under an environment, such as fading environment, in which temporal phase changes are quantitatively generated.

Therefore, in case of high speed fading, even when the reception quality of HS-PDSCH is comparatively good, the reception quality of HS-SCCH is deteriorated. Accordingly, the CRC calculation result of HS-SCCH is determined as NG, and a decode process of HS-PDSCH cannot be performed. Here, since DTX is transmitted to the base station, combining of reception waves is not performed in the HARQ process. As a result, a reception speed is reduced and throughput in the mobile terminal and throughput in the system may be decreased. This phenomenon occurs also in the art disclosed in Japanese Patent Application Laid-Open No. 2004-248196.

SUMMARY OF THE INVENTION

The present invention has been made in view of the above problems and has an object of improving throughputs in a mobile terminal and a system by reducing an HS-SCCH error rate and the number of retransmission based on HARQ.

In order to achieve the object, the present invention employs a mobile terminal apparatus and a channel compensation method in the mobile terminal apparatus as follows.

(1) The mobile terminal apparatus of the present invention is a mobile terminal apparatus for decoding a first channel reception signal received from a base station apparatus after a channel compensation process in use of a channel estimation value so as to carry out a decode process on a second channel reception signal received from the base station apparatus in use of the decoding result of the first channel reception signal, including a retransmission control function for carrying out said decode process in use of said second channel reception signal and a retransmission signal of the reception signal, said apparatus comprising: a channel compensation processor configured to carry out a channel compensation process on said first channel reception signal in use of the channel estimation value obtained for said first channel reception signal based on a plurality of known signals received from the base station apparatus; and a channel re-compensation processor configured to carry out the channel compensation process again on said first channel reception signal with said channel estimation value of said first channel reception signal obtained based on a plurality of known signals including at least a known signal which is received after reception of said first channel reception signal when a decoding result of said first channel reception signal after the channel compensation process by the channel compensation processor is defined as an error.

(2) The mobile terminal apparatus may further includes a channel estimation processor configured to obtain the channel estimation value of said first channel reception signal in use of said plurality of known signals; and a delay processor configured to delay said first channel reception signal and input the same into the channel re-compensation processor in parallel with the channel estimation value obtained by the channel estimation processor so as to include a known signal received after the reception of said first channel reception signal for the channel compensation into said plurality of known signals.

(3) The mobile terminal apparatus may further includes a second channel decode processor configured to decode said second channel reception signal in use of a decoding result when the result of decoding said first channel reception signal after the channel compensation process by the channel re-compensation processor is not defined as an error; and a retransmission control buffer configured to buffer said second channel reception signal decoded by the second channel decode processor in preparation for executing said retransmission control function.

(4) The mobile terminal apparatus may further includes a first channel non-reception notification unit configured to notify an error to the base station apparatus when the result of decoding said first channel reception signal after the channel compensation process performed again by the channel re-compensation processor is defined as an error.

(5) The mobile terminal apparatus may further includes a second channel decode result notification unit configured to notify normality or abnormality in the decoding result to the base station apparatus when the decode process by the second channel decode processor is completed within a predetermined time which is regulated from a completion of receiving said second channel reception signal to a completion of decoding the second channel reception signal.

(6) A method of channel compensation in the mobile terminal apparatus of the present invention is a method of channel compensation in a mobile terminal apparatus for decoding a first channel reception signal received from a base station apparatus after a channel compensation process in use of a channel estimation value so as to carry out a decode process on a second channel reception signal received from the base station apparatus in use of the decoding result of the first channel reception channel, said apparatus including a retransmission control function for carrying out said decode process in use of the second channel reception signal and a retransmission signal of the reception signal, said method comprising: a channel compensating step for carrying out a channel compensation process on said first channel reception signal in use of the channel estimation value obtained for said first channel reception signal based on a plurality of known signals received from the base station apparatus; and a channel re-compensating step for carrying out the channel compensation process of said first channel reception signal again with said channel estimation value of said first channel reception signal obtained based on a plurality of known signals including at least a known signal which is received after reception of said first channel reception signal when a decoding result of said first channel reception signal after the channel compensation process in the channel compensating step is defined as an error.

(7) The method of channel compensation may further include a channel estimating step for obtaining the channel estimation value of said first channel reception signal in use of said plurality of known signals; and a delaying step for delaying said first channel reception signal so as to include a known signal received after the reception of said first channel reception signal for the channel compensation into said plurality of known signals, wherein, in the channel re-compensating step, said re-compensation process is carried out by receiving the channel estimation value obtained in the channel estimating step in parallel with said first channel reception signal delayed in the delaying step.

(8) The method of channel compensation may further include a second channel decoding step for decoding said second channel reception signal in use of a decoding result when the result of decoding said first channel reception signal after the channel compensation process in the channel re-compensating step is not defined as an error; and a retransmission control buffering step for buffering said second channel reception signal decoded in the second channel decoding step in preparation for executing said retransmission control function.

(9) The method of channel compensation may further include notifying an error to the base station apparatus when the result of decoding said first channel reception signal after the channel compensation performed again in the channel re-compensating step is defined as an error.

(10) The method of channel compensation may further include notifying normality or abnormality in the decoding result to the base station apparatus when the decode process in the second channel decoding step is completed within a predetermined time which is regulated from a completion of receiving said second channel reception signal to a completion of decoding the second channel reception signal.

According to the present invention, at least the following advantages can be provided.

(1) Since a channel compensation process of a first channel is carried out again in use of a channel estimation value of an appropriate time, that is, a channel estimation value of the first channel reception signal, obtained based on a plurality of known signals including at least a known signal which is received after reception of the first channel reception signal, an error rate of the first channel can be reduced (that is, a decoding success rate is improved) even when the result of decoding of the first channel reception signal is an error under an environment such as fading environment, in which phase of receiving phase changes. Therefore, the decoding success rate of a second channel is also improved, the number of retransmission is reduced, and reception speed in the mobile terminal apparatus is increased. As a result, throughput in the mobile terminal and throughput in the system can be improved.

(2) Since the reception signal of the first channel is delayed and input into the channel re-compensation processor in parallel with the channel estimation value obtained by the channel estimation processor so as to include a known signal received after the reception of the first channel reception signal for the channel compensation into the plurality of known signals, control of the range of known signals used for channel compensation (channel estimation period) can be performed. Further, a single channel estimation processor can obtain channel estimation values in different channel estimation periods, so that it contributes significantly to a simplification of structure of the apparatus.

(3) When the result of decoding the first channel in the channel re-compensation process is not an error, a decode process is carried out on the second channel and the decoded second channel reception signal is buffered in preparation for retransmission control, so that the number of retransmission according to the retransmission control can be reduced. Therefore, a reception speed in the mobile terminal apparatus is increased and throughput in the mobile terminal apparatus can be improved.

DESCRIPTION OF THE PREFERRED EMBODIMENTS (A) Brief Overview

In a channel estimation process and channel compensation process of HS-SCCH, HS-SCCH symbol is buffered to calculate a channel estimation value at an appropriate time (hereinafter, referred to as re-demodulation channel estimation value) to perform channel compensation. When the result of CRC calculation of HS-SCCH after the demodulation and decoding is NG, a decode process is carried out on a re-demodulated HS-SCCH and CRC calculation is carried out again. When the result of the CRC calculation is OK, an HS-PDSCH decode process is carried out in use of the result of the HS-SCCH decode process.

When TBS (Transport Block Size) of HS-PDSCH is small and the HS-PDSCH decode process is completed before the timing of ACK/NACK transmission, a normal ACK/NACK transmission process is carried out. When the HS-PDSCH decode process is not completed before the timing of ACK/NACK transmission, NACK is transmitted and decoded HS-PDSCH is stored in an HARQ buffer after the completion of the decode process.

As a result, with an HARQ combining, the number of retransmission is reduced, so that a reception speed is increased and throughput in the mobile terminal and throughput in the system can be improved.

Hereinafter, the mobile terminal for realizing the functions will be described with reference to the drawings.

(B) Description of an Embodiment

Figure 1:
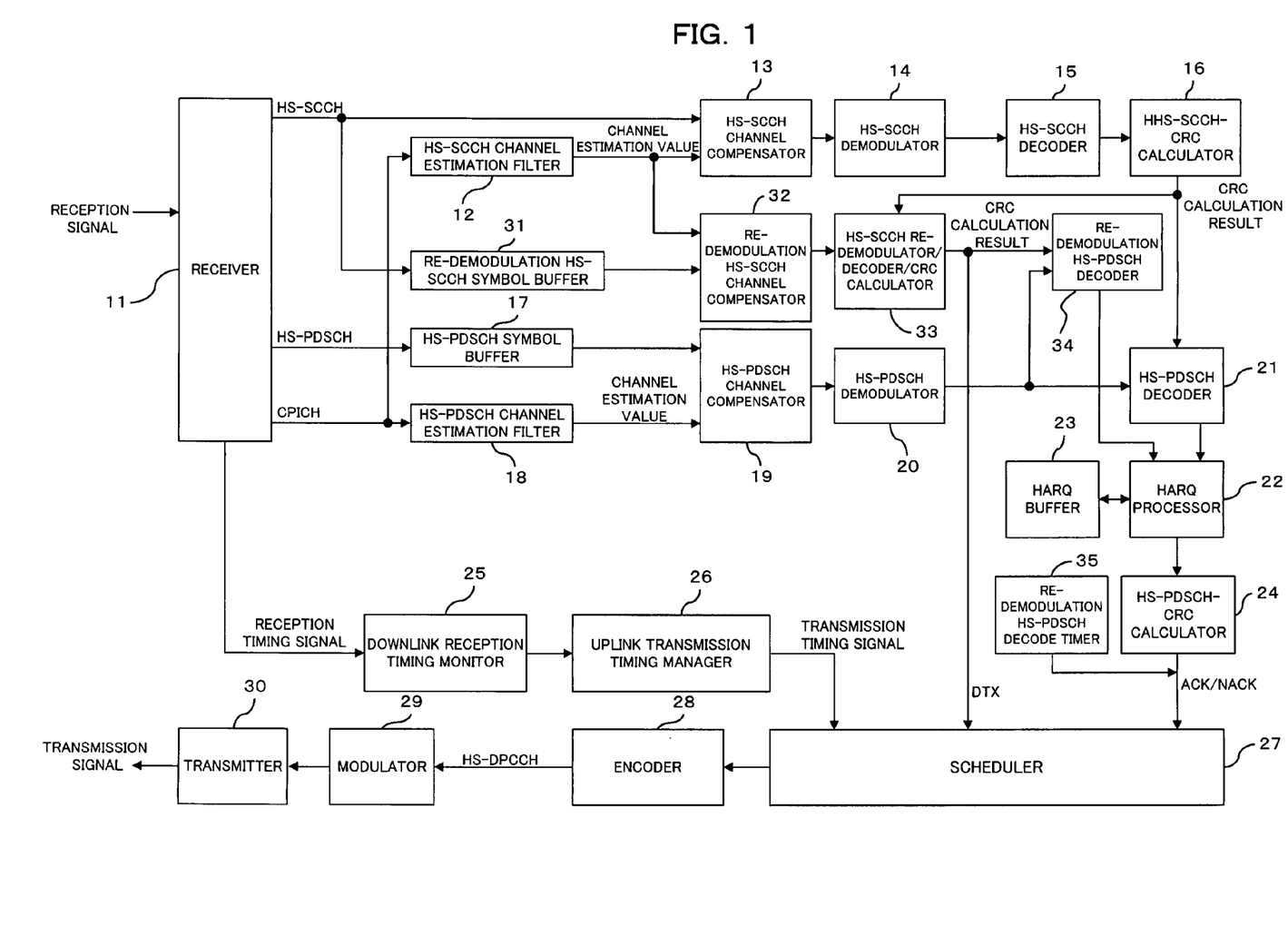
FIG. 1 is a functional block diagram showing a structure of a relevant part of a mobile terminal adapted to an HSDPA, according to an embodiment of the present invention.

FIG. 1 is a block diagram showing a relevant part of a mobile terminal adapted to an HSDPA system according to an embodiment of the present invention. The mobile terminal (mobile terminal apparatus) shown in FIG. 1 includes a receiver 11, an HS-SCCH channel estimation filter 12, an HS-SCCH channel compensator 13, an HS-SCCH demodulator 14, an HS-SCCH decoder 15, an HS-SCCH-CRC calculator 16, an HS-PDSCH symbol buffer 17, an HS-PDSCH channel estimation filter 18, an HS-PDSCH channel compensator 19, an HS-PDSCH demodulator 20, an HS-PDSCH decoder 21, an HARQ processor 22, an HARQ buffer 23, an HS-PDSCH-CRC calculator 24, a downlink reception timing monitor 25, an uplink transmission timing manager 26, a scheduler 27, an encoder 28, a modulator 29, and a transmitter 30, which have same functions as those shown in FIG. 5, respectively. The mobile terminal additionally includes a re-demodulation HS-SCCH symbol buffer 31, a re-demodulation HS-SCCH channel compensator 32, an HS-SCCH re-demodulator/decoder/CRC calculator 33, a re-demodulation HS-PDSCH decoder 34, and a re-demodulation HS-PDSCH decoding timer 35.

Here, the receiver 11 performs processes such as path detection or dispreading for a downlink reception signal received with a reception antenna (not shown) and separates the downlink reception signals for each channel of CPICH, HS-SCCH, and HS-PDSCH. The HS-SCCH channel estimation filter (channel estimation processor) 12 obtains a channel estimation value to be used for channel compensation of HS-SCCH (a first channel) in use of a plurality of CPICH symbols (known signals) received from the receiver 11.

The HS-SCCH channel compensator 13 performs channel compensation on HS-SCCH symbol input by the receiver 11 in use of the channel estimation value obtained by the HS-SCCH channel estimation filter 12. The HS-SCCH demodulator 14 demodulates HS-SCCH symbols after channel compensation is performed in the HS-SCCH channel compensator 13.

The HS-SCCH decoder 15 decodes the HS-SCCH symbols demodulated by the HS-SCCH demodulator 14. The HS-SCCH-CRC calculator 16 carries out CRC calculation on the HS-SCCH symbols decoded by the HS-SCCH decoder 15 and the calculation results are respectively input into the HS-PDSCH decoder 21 and the HS-SCCH re-demodulator/decoder/CRC calculator 33.

The HS-PDSCH channel estimation filter 18, as described so far, obtains a channel estimation value for HS-PDSCH (second channel) from CPICH symbol separated by the receiver 11 and calculates the channel estimation value by averaging a plurality of CPICH symbols (for example, CPICH symbols of an amount of 2 slots).

The HS-PDSCH symbol buffer 17, also as described so far, holds a reception signal (HS-PDSCH symbols) of HS-PDSCH separated by the receiver 11 to delay temporarily. The HS-PDSCH symbol buffer 17 delays the received HS-PDSCH symbols by symbol unit so that a channel estimation value, which is calculated by averaging a plurality of past and future CPICH symbols with respect to the CPICH symbol received at the same timing of a target HS-PDSCH symbol of the channel compensation, is used for the channel compensation process of the HS-PDSCH symbol.

For example, if the number of CPICH symbols to be averaged in the HS-PDSCH channel estimation filter 18 corresponds to 2 slots, the HS-PDSCH symbol buffer 17 delays the received HS-PDSCH symbol by 1 slot so that the received HS-PDSCH symbol of channel compensation is input into the HS-PDSCH channel compensator 19 in a subsequent stage at a timing of middle of the CPICH symbols of 2 slots to be averaged.

The HS-PDSCH channel compensator 19 carries out a channel compensation process on the HS-PDSCH symbols delayed in the HS-PDSCH symbol buffer 17 in use of the channel estimation value obtained by the HS-PDSCH channel estimation filter 18. As a result, as mentioned above, the HS-PDSCH channel compensator 19 carries out the channel compensation process of the HS-PDSCH symbols in use of the channel estimation value which is calculated by averaging a plurality of past and future CPICH symbols with respect to the HS-PDSCH symbol for the channel compensation.

The HS-PDSCH demodulator 20 demodulates the HS-PDSCH symbols after the channel compensation by the HS-PDSCH channel compensator 19. The HS-PDSCH decoder (second channel decode processor) 21 decodes the HS-PDSCH symbols demodulated by the HS-PDSCH demodulator 20 in use of information required for HS-PDSCH decoding such as spread code information included as an HS-SCCH decoding result when there is no error in the demodulated HS-SCCH (that is, when the result of CRC calculation by the HS-SCCH-CRC calculator 16 is not an error).

The HARQ buffer (retransmission control buffer) 23 buffers the HS-PDSCH symbols decoded by the HS-PDSCH decoder 21 in preparation for retransmission control based on HARQ. The HARQ processor 22 carries out a combining process on the HS-PDSCH symbols decoded by the HS-PDSCH decoder 21 based on HARQ and holds the HS-PDSCH symbols in the HARQ buffer 23 in preparation for the combining process, and combines the HS-PDSCH symbols stored in the HARQ buffer 23 and HS-PDSCH symbols received by retransmission.

The HS-PDSCH-CRC calculator 24 carries out CRC calculation on the HS-PDSCH symbols decoded by the HARQ processor 22 for an error checking. The result (OK or NG) of the error checking is provided, as an ACK/NACK signal to be transmitted to the base station, to the scheduler 27.

The downlink reception timing monitor 25 monitors the downlink reception timing of each channel received by the receiver 11. The uplink transmission timing manager 26 manages uplink transmission timing so as to transmit the ACK/NACK (DTX) to the base station at the timing shown in FIG. 4 in accordance with the downlink reception timing monitored by the downlink reception timing monitor 25.

The scheduler 27 schedules transmission timing of the DTX in case that the HS-SCCH re-demodulator/decoder/CRC calculator 33 fails in re-demodulation and re-decode of HS-SCCH (the CRC calculation result was NG) and the CRC calculation result (ACK/NACK) in the HS-PDSCH-CRC calculator 24, in accordance with the transmission timing managed by the uplink transmission timing manager 26.

The encoder 28 encodes information (ACK/NACK/DTX) which is scheduled and sequentially input by the scheduler 27 into HS-DPCCH data. The modulator 29 modulates information encoded in the encoder 28. The transmitter 30 transmits the modulated signals to the base station via a transmission antenna as HS-DPCCH radio signals.

The re-demodulation HS-SCCH symbol buffer 31 holds (buffers) the HS-SCCH symbols from the receiver 11 in preparation for re-modulation in a case that the CRC calculation result in the HS-SCCH-CRC calculator 16 is NG. The re-demodulation HS-SCCH channel compensator 32 carries out channel compensation on the HS-SCCH buffered in the re-demodulation HS-SCCH symbol buffer 31 in use of the HS-SCCH channel estimation value obtained by the HS-SCCH channel estimation filter 12. Here, as the HS-SCCH symbol is buffered (delayed) by the re-demodulation HS-SCCH symbol buffer 31, the re-demodulation HS-SCCH channel compensator (channel re-compensation processor) 32 can carry out HS-SCCH cannel compensation in use of a channel estimation value (re-demodulation channel estimation value) (that is calculated from a plurality of CPICH symbols including a future CPICH symbol received after reception of HS-SCCH symbol) at an appropriate time, as described below with reference to FIG. 3.

In other words, the re-demodulation HS-SCCH symbol buffer 31 functions as a delay processor for delaying the HS-SCCH symbols and inputting into the re-demodulation HS-SCCH channel compensator 32 in parallel with the channel estimation value obtained in the HS-SCCH channel estimation filter 12 so that CPICH symbols, which are received after the HS-SCCH symbol for channel compensation is received, are included into a plurality of CPICH symbols used for the HS-SCCH channel re-estimation.

That is, as the buffering time at the re-demodulation HS-SCCH symbol buffer 31 is made longer by symbol unit, the channel estimation filter range is slid toward temporally future direction by symbol unit with respect to the HS-SCCH symbol for the channel compensation. Therefore, by setting buffer time to slide so that the HS-SCCH symbol for the channel compensation is arranged in the middle of the plurality of past and future CPICH symbols, a single HS-SCCH channel estimation filter 12 can obtain both of the channel estimation value for the first HS-SCCH channel compensation and the re-demodulation channel estimation value for the second channel estimation. As a result, it contributes significantly to a simplification of structure of the apparatus.

The HS-SCCH re-demodulator/decoder/CRC calculator 33 carries out demodulation, decoding, and CRC calculation on the HS-SCCH symbol which is channel compensated by the re-demodulation HS-SCCH channel compensator 32, similar to the respective processes in the HS-SCCH demodulator 14, the HS-SCCH decoder 15, and the HS-SCCH-CRC calculator 16. These processes in the HS-SCCH re-demodulator/decoder/CRC calculator 33 are carried out when the CRC calculation result in the HS-SCCH-CRC calculator 16 is NG. Here, when the CRC calculation result in the HS-SCCH re-demodulator/decoder/CRC calculator 33 is NG (error), DTX is output to the scheduler 27 in order to transmit the result to the base station apparatus by HS-DPCCH.

In other words, when the decoding result of the HS-SCCH is error, the HS-SCCH re-demodulator/decoder/CRC calculator 33 functions as a first channel non-reception notifier to notify the result to the base station apparatus, cooperatively with the scheduler 27.

The re-demodulation HS-PDSCH decoder 34 decodes the HS-PDSCH symbol demodulated by the HS-PDSCH demodulator 20 in use of the decoding information when the CRC calculation result in the HS-SCCH re-demodulator/decoder/CRC calculator 33 is OK and the re-modulation of the HS-SCCH is successful. The decoding result in the re-demodulation HS-PDSCH decoder 34 is buffered in the HARQ buffer 23 via the HARQ processor 21.

According to the mobile terminal of the present embodiment, when demodulation and decoding of the HS-SCCH are not successful, the filter range of the HS-SCCH channel estimation filter 12 is optimized, and re-demodulation and re-decoding of the HS-SCCH are carried out in use of a channel estimation value of an appropriate time. When demodulation is successful, decoding of the PDSCH is performed in use of the demodulation result. The decoding result is buffered in the HARQ buffer 23 in preparation for a combining process of retransmission.

The re-demodulation HS-PDSCH decoding timer 35 controls an ACK/NACK transmission process (timing). For example, it controls the scheduler 27 so as to operate normal ACK/NACK transmission when TBS of HS-PDSCH is small and an HS-PDSCH decoding process based on the re-demodulated and re-decoded HS-SCCH is completed before ACK/NACK transmission timing, or transmit NACK when the decoding process is not completed before the ACK/NACK transmission timing.

In other words, in case that the time between the completion of the HS-PDSCH reception and the completion of the HS-PDSCH decoding process is determined as a predetermined period of time, the scheduler 27, together with the re-demodulation HS-PDSCH decoding timer 35, functions as a second channel decoding result notifier for notifying 'normality' (ACK) or 'abnormality' (NACK) of the decoding result to the base station apparatus when the HS-PDSCH decoding process is completed during the predetermined period and notifying 'abnormality' (NACK) as a decoding result when the HS-PDSCH decoding process is not completed during the predetermined period.

An operation of the mobile terminal of the present embodiment, which has the above structure, will be described below.

Firstly, in the mobile terminal, a signal received by the reception antenna (not shown) is input to the receiver 11. As described so far, processes such as path detection and a dispreading process are carried out in the receiver 11 and each channel of CPICH, HS-SCCH, and HS-PDSCH is separated. The separated CPICH is input to the HS-SCCH channel estimation filter 12 and the HS-PDSCH channel estimation filter 18, respectively.

On the other hand, the HS-SCCH reception symbols separated by the receiver 11 are buffered in the re-modulation HS-SCCH symbol buffer 31 in preparation for re-modulating (re-decoding) and input into the HS-SCCH channel compensator 13. As described so far, the HS-SCCH channel compensator 13 carries out channel compensation in use of the channel estimation value obtained in the HS-SCCH channel estimation filter 12 (channel estimating step, channel compensating step).

Figure 3:
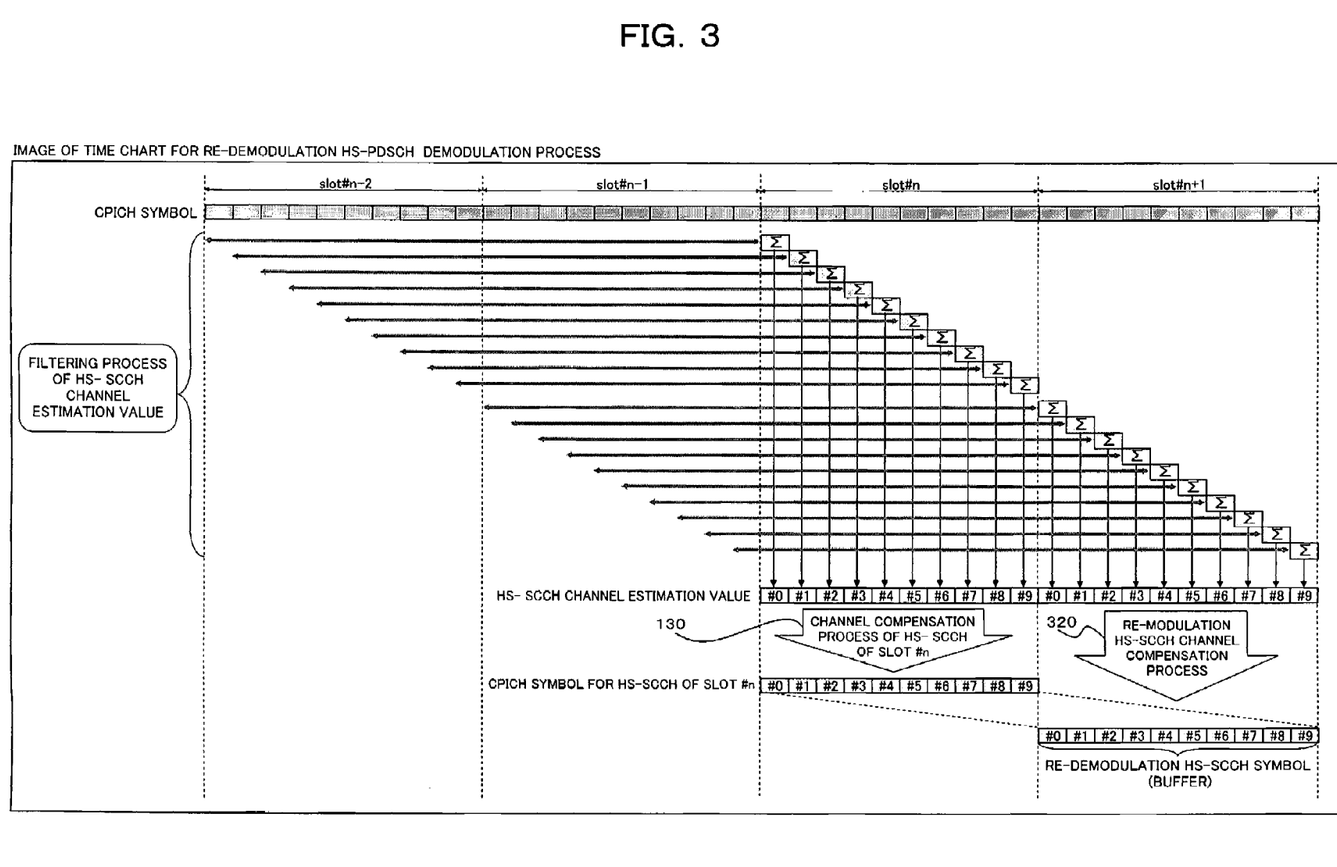
FIG. 3 is a diagram showing, by symbol unit, a time chart image of a re-demodulation HS-SCCH demodulation process in the mobile terminal of FIG. 1.

For example, as shown in FIG. 3, the number of symbols in a single slot is defined as 10 of #0 to #9 and CPICH symbols (channel estimation filter period) used for HS-SCCH channel estimation (averaging process) are assumed as 2 slots (20 symbols). Here, focusing attention on the symbol #0 in time of the slot #n, the HS-SCCH channel estimation value for the HS-SCCH symbol #0 is obtained by averaging (each "Σ" represents an averaging process in FIG. 3) CPICH symbols from the first CPICH symbol in the past slot #n−2 to the last CPICH symbol in the future slot #n−1. In use of the channel estimation value obtained by this, channel compensation is carried out on the HS-SCCH symbol #0.

Here, for the subsequence HS-SCCH symbols #1 to #9 in slot #n, similarly, a compensation process is carried out in use of the channel estimation values obtained within a channel estimation filter period sifted one by one (see an arrow 130 in FIG. 3).

The HS-SCCH symbols which are channel compensated as described above are treated in the modulation process, decode process and CRC calculation process respectively in the HS-SCCH modulator 13, the HS-SCCH decoder 15, and the HS-SCCH-CRC calculator 16 and the CRC calculation result is output to the HS-SCCH re-demodulator/decoder/CRC calculator 33 and the re-demodulation HS-PDSCH decoder 34.

Further, HS-PDSCH reception symbol received by the receiver 11 is also buffered in the HS-PDSCH symbol buffer 17, channel compensated by the HS-PDSCH channel compensator 19 in use of a channel estimation value obtained in the HS-PDSCH channel estimation filter 18, demodulated in the HS-PDSCH demodulator 20, and then decoded by the HS-PDSCH decoder 21 in use of necessary information for decoding HS-PDSCH decoded by the HS-SCCH-CRC calculator 16.

The HS-PDSCH symbol decoded by the HS-PDSCH decoder 21 is buffered in the HARQ buffer 23 via the HARQ processor 22 in preparation for HARQ combining of retransmission. When the retransmitted HS-PDSCH symbol is received by the HARQ processor 22, a combining process is carried out with the HS-PDSCH symbol buffered in the HARQ buffer 23.

Outputs of the HARQ processor 22 are input into the HS-PDSCH-CRC calculator 24. The HS-PDSCH-CRC calculator 24 carries out error checking by CRC calculation and the result (OK or NG) is output to the scheduler 27 as ACK/NACK signal.

Transmission timings of the ACK/NACK signals are scheduled by the scheduler 27 in accordance with the transmission timing from the uplink transmission timing manager 26 to output to the encoder 28, encoded as HS-DPCCH data in the encoder 28, modulated in the modulator 29, and then transmitted by the transmitter 30 to the base station as HS-DPCCH radio signals.

These are the processes for the case that the HS-SCCH is correctly demodulated and decoded. In case that the HS-SCCH is not correctly demodulated and decoded, re-demodulation and re-decoding processes are carried out on the HS-SCCH. In other words, the re-demodulation HS-SCCH channel compensator 32 performs channel compensation on the HS-SCCH symbols buffered (delayed) in the re-demodulation HS-SCCH symbol buffer 31 in use of the channel estimation value obtained in the HS-SCCH channel estimation filter 12.

That is, until calculation of the channel estimation value adapted for the reception signal (HS-SCCH symbol) at the time of slot #n is completed in the re-demodulation HS-SCCH symbol buffer 31, the HS-PDSCH symbol buffer 17 buffers (delays) the HS-SCCH symbols (delay processing step). The re-demodulation HS-SCCH channel compensator 32 receives HS-SCCH symbol at the time of slot #n along with the channel estimation value adapted to a reception wave at the time of slot #n and carries out channel compensation on the HS-SCCH symbol with the channel estimation value.

In more detail, in case of FIG. 3, for example, focusing attention on the symbol #0 in slot #n, a channel estimation value for the HS-SCCH symbol #0 is obtained by averaging CPICH symbols from the first CPICH symbol in the past slot #n−1 to the last CPICH symbol in the future slot #n which is received after the reception of the HS-SCCH symbol #0 in slot #n. In use of the channel estimation value for re-demodulation obtained as described above, channel compensation is carried out on the HS-SCCH symbol #0. Here, for the subsequence HS-SCCH symbols #1 to #9 in slot #n, similarly, a compensation process is carried out in use of the channel estimation values obtained within a channel estimation filter period sifted one by one (see an arrow 320 in FIG. 3).

Thereafter, the HS-SCCH symbols which are channel compensated as described above are treated in the modulating process, decoding process and CRC calculation process in the HS-SCCH re-demodulator/decoder/CRC calculator 33 one more time and the CRC calculation result is output to the re-demodulation HS-PDSCH decoder 34 and the scheduler 27. Here, when the CRC calculation result is OK, the decoded HS-SCCH symbol is used for the HS-PDSCH demodulation in the re-demodulation HS-PDSCH decoder 34. On the other hand, when the result is NG, the HS-SCCH is not correctly demodulated and decoded in the re-demodulation and re-decoding, so that DTX is scheduled in the scheduler 27 to be transmitted to the base station.

Further, when the CRC calculation result in the HS-SCCH re-demodulator/decoder/CRC calculator 33 is OK, the HS-SCCH symbol decoded in the re-demodulation HS-PDSCH decoder 34 is buffered in the HARQ buffer 23 via the HARQ processor 22 in preparation for HARQ combination of retransmission.

Thereafter, a combination process of the retransmitted HS-PDSCH symbol and the HS-PDSCH symbol buffered in the HARQ buffer 23 is carried out in the HARQ processor 22. The HS-PDSCH-CRC calculator 24 performs CRC calculation on the combined HS-PDSCH. In accordance with the calculation result (OK or NG), ACK/NACK is output to the scheduler 27 and transmitted to the base station by HS-DPCCH via the encoder 28, the modulator 29, and the transmitter 30.

Here, with a function of the re-demodulation HS-PDSCH decoding timer 35, normal ACK/NACK transmission is performed when the TBS of HS-PDSCH is small and the HS-PDSCH decoding process based on the re-demodulated and re-decoded HS-SCCH is completed before the ACK/NACK transmission timing, and NACK is transmitted when the HS-PDSCH decoding process is not completed before the ACK/NACK transmission timing.

Figure 2:
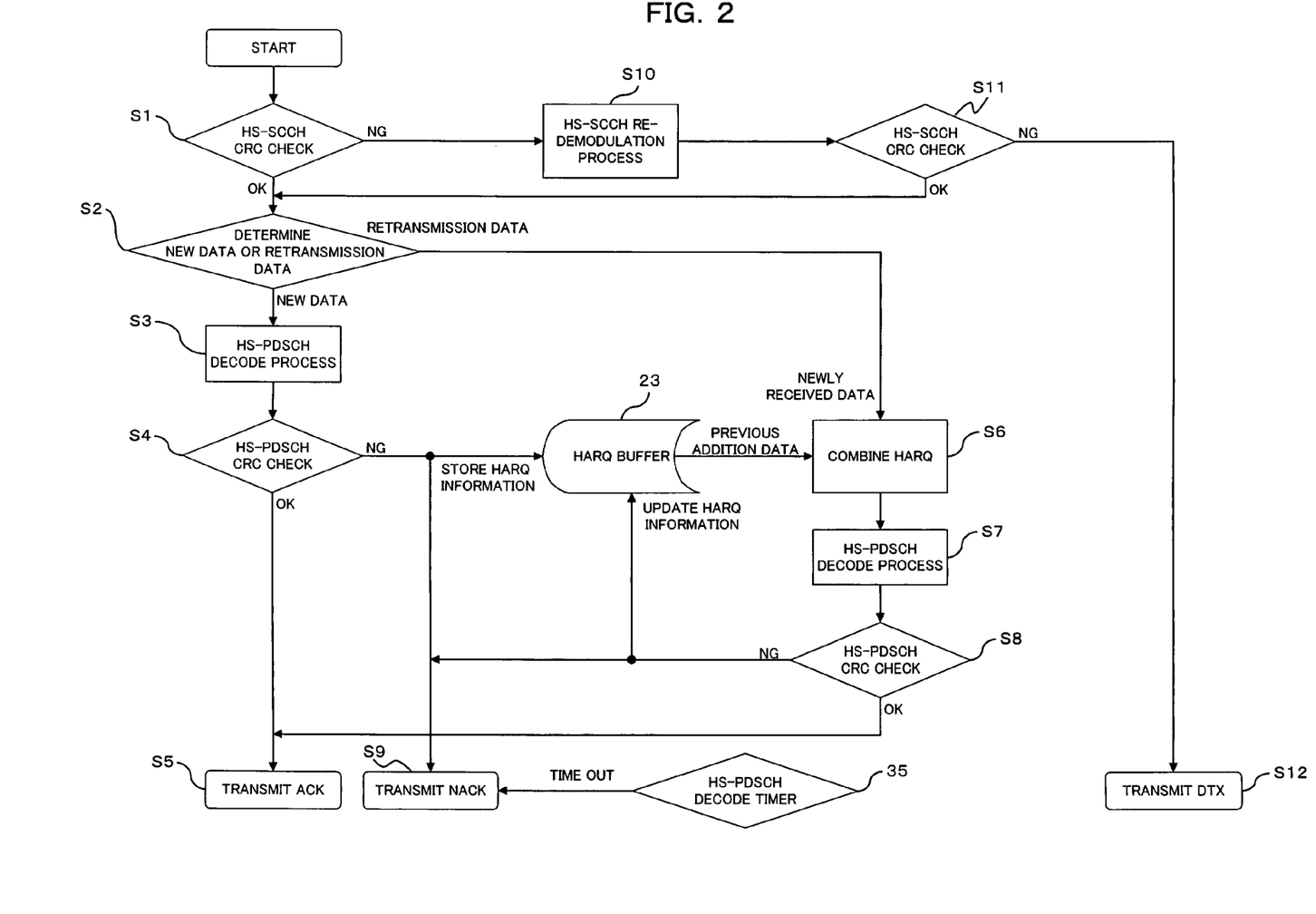
FIG. 2 is a flowchart showing an HARQ operation in the mobile terminal of FIG. 1.

FIG. 2 is a flowchart showing the above described operation. That is, in the mobile terminal, when the CRC calculation (error checking) result in the HS-SCCH-CRC calculator 16 is OK, the HS-PDSCH decoder 21 determines whether the HS-PDSCH symbol demodulated in the HS-PDSCH demodulator 20 is new data or retransmitted data (form OK route in step S1 to step S2). When the data is new data, a decoding process is carried out on the HS-PDSCH symbol in use of the decoding information of HS-SCCH symbol whose result is OK in the CRC calculation result (from "new data" route in step S2 to step S3; the second channel decoding step).

Then, the HS-PDSCH-CRC calculator 24 carries out CRC calculation and error checking on the decoded HS-PDSCH symbol (step S4). When the result is OK, ACK is transmitted to the base station by HS-DPCCH via the scheduler 27, the encoder 28, the modulator 29 and the transmitter 30 (from OK route in step S4 to step S5). When the result is NG, NACK is transmitted to the base station by HS-DPCCH via the scheduler 27, the encoder 28, the modulator 29 and the transmitter 30 (from NG route in step S4 to step S9) while the decoded HS-PDSCH symbol is buffered as HARQ information in the HARQ buffer 23 in preparation for an HARQ combining process (retransmission control buffering step).

Thereafter, the base station which received NACK carries out retransmission control and retransmission based on the HARQ. In the mobile terminal, since the HS-PDSCH symbol demodulated in the HS-PDSCH demodulator 20 is determined as retransmission data unless the CRC calculation result in the HS-SCCH-CRC calculator 16 is determined as NG, the HARQ processor 22 combines newly decoded HS-PDSCH symbol and the HS-PDSCH symbol buffered in the HARQ buffer 23 (from "retransmission data" route in step S2 to step S6). Then, the HS-PDSCH decoder 21 carries out an HS-PDSCH decode process and the HS-PDSCH-CRC calculator 24 carries out CRC calculation (error checking) (steps S7 and S8).

As a result, when the result is indicated as OK, ACK is transmitted to the base station by HS-DPCCH via the scheduler 27, the encoder 28, the modulator 29, and the transmitter 30 (from OK route in step S8 to step S5). When the result is indicated as NG, NACK is transmitted to the base station by HS-DPCCH via the scheduler 27, the encoder 28, the modulator 29, and the transmitter 30 (from NG route in step S8 to step S9). Here, the result of the failed HS-PDSCH decoding is also buffered in the HARQ buffer 23 to update HARQ information.

In the above step S1, when the result of CRC calculation of HS-SCCH is NG and HS-SCCH is not correctly decoded, the HS-SCCH re-demodulation process, which is already described with reference to FIG. 3, is performed by the re-demodulation HS-SCCH symbol buffer 31, the re-demodulation HS-SCCH channel compensator 32, the HS-SCCH re-demodulator/decoder/CRC calculator 33, and the re-demodulation HS-PDSCH decoder 34 (from NG route in step S1 to step S10; channel re-compensating step).

When the result of CRC calculation result in the HS-SCCH re-demodulator/decoder/CRC calculator 33 is OK, processes following the step S2 are implemented (step S11, route of "OK"). Then, a decode process of HS-PDSCH symbol is carried out in use of HS-SCCH symbol which is correctly demodulated in the demodulating process. When the CRC calculation result is NG, HS-PDSCH symbol is buffered in the HARQ buffer 23.

On the other hand, when the result of CRC calculation in the HS-SCCH re-demodulator/decoder/CRC calculator 33 is NG, HS-SCCH is not correctly decoded in the re-decode process, so that DTX is transmitted for the first time at that time to the base station by HS-DPCCH via the scheduler 27, the encoder 28, the modulator 29 and the transmitter 30 (from NG route in step S11 to step S12).

As described above, according to the mobile terminal of the present embodiment, the CRC calculation result after HS-SCCH demodulation and decoding is NG, the channel estimation filter period is optimized again so as to include future CPICH symbol received after the reception of HS-SCCH symbol for the channel compensation into the CPICH symbols used for the channel compensation process to improve the accuracy of channel estimation value, and channel compensation is carried out in use of the improved channel estimation value. As a result, the probability that the CRC calculation result of HS-SCCH becomes OK is increased (an error rate of HS-SCCH can be reduced), so that the probability of decoding HS-PDSCH is also improved.

Therefore, the probability that HS-PDSCH symbol is buffered in HARQ buffer 23 improves. As a result, the number of transmission according to HARQ can be reduced, a reception speed in the mobile terminal is improved, and throughput of the mobile terminal and throughput in the system can be improved.

It will be appreciated that the present invention is not limited to the above described embodiments and can be implemented with modifications within the gist of the present invention.

For example, in the above embodiment, the channel estimation filter range used for HS-SCCH demodulation is defined as a plurality of past and future CPICH symbols including, in the middle, a CPICH symbol received at the same time of the reception of HS-SCCH symbol for channel compensation. However, the HS-SCCH channel compensation system can be improved if at least a future CPICH symbol received after the reception of HS-SCCH symbol for the channel compensation is included in the filter range. Further, the number of symbols in the channel compensation filter range may be changeable.

As described above, according to the present invention, an error rate in the first channel can be reduced since another channel compensation process on the fist channel is carried out in use of a channel estimation value at a proper time, even when the first channel is not correctly demodulated in an environment such as fading environment, in which phase of receiving wave changes. Accordingly, the possibility that the decoding of a second channel succeeds is increased and the number of retransmission according to retransmission control can be reduced. Further, a reception speed in the mobile terminal apparatus is improved, and throughput of the mobile terminal and throughput of the system can be improved, so that it is extremely useful in a technical field of mobile communications.

What is claimed is:

1. A mobile terminal apparatus for decoding a first channel reception signal received from a base station apparatus after a channel compensation process in use of a channel estimation value so as to carry out a decode process on a second channel reception signal received from the base station apparatus in use of the decoding result of the first channel reception signal, including a retransmission control function for carrying out said decode process in use of said second channel reception signal and a retransmission signal of the reception signal, said apparatus comprising:
    a channel compensation processor configured to carry out a channel compensation process on said first channel reception signal in use of the channel estimation value obtained for said first channel reception signal based on a plurality of known signals received from the base station apparatus; and
    a channel re-compensation processor configured to carry out the channel compensation process again on said first channel reception signal with said channel estimation value of said first channel reception signal obtained based on a plurality of known signals including at least a known signal which is received after reception of said first channel reception signal when a decoding result of said first channel reception signal after the channel compensation process by the channel compensation processor is defined as an error.

2. The mobile terminal apparatus according to claim 1, further comprising:
    a channel estimation processor configured to obtain the channel estimation value of said first channel reception signal in use of said plurality of known signals; and
    a delay processor configured to delay said first channel reception signal and input the same into the channel re-compensation processor in parallel with the channel estimation value obtained by the channel estimation processor so as to include a known signal received after the reception of said first channel reception signal for the channel compensation into said plurality of known signals.

3. The mobile terminal apparatus according to claim 2, further comprising
    a second channel decode processor configured to decode said second channel reception signal in use of a decoding result when the result of decoding said first channel reception signal after the channel compensation process by the channel re-compensation processor is not defined as an error; and
    a retransmission control buffer configured to buffer said second channel reception signal decoded by the second channel decode processor in preparation for executing said retransmission control function.

4. The mobile terminal apparatus according to claim 1, further comprising:
    a second channel decode processor configured to decode said second channel reception signal in use of a decoding result when the result of decoding said first channel reception signal after the channel compensation process by the channel re-compensation processor is not defined as an error; and
    a retransmission control buffer configured to buffer said second channel reception signal decoded by the second channel decode processor in preparation for executing said retransmission control function.

5. The mobile terminal apparatus according to claim 1, further comprising:
    a first channel non-reception notification unit configured to notify an error to the base station apparatus when the result of decoding said first channel reception signal after the channel compensation process performed again by the channel re-compensation processor is defined as an error.

6. The mobile terminal apparatus according to claim 1, further comprising:
    a second channel decode result notification unit configured to notify normality or abnormality in the decoding result to the base station apparatus when the decode process by the second channel decode processor is completed within a predetermined time which is regulated from a completion of receiving said second channel reception signal to a completion of decoding the second channel reception signal.

7. The mobile terminal apparatus according to claim 6, wherein the second channel decode result notification unit notifies abnormality to the base station apparatus as a result of said decode process when the decode process by the second channel decode processor is not completed within said predetermined time.

8. The mobile terminal apparatus according to claim 1, wherein said first channel is an HS-SCCH (High Speed-Shared Control Channel) of an HSDPA (High Speed Downlink Packet Access) system and said second channel is an HS-PDCH (High Speed-Physical Downlink Shared Channel) of said HSDPA system.

9. A method of channel compensation in a mobile terminal apparatus for decoding a first channel reception signal received from a base station apparatus after a channel compensation process in use of a channel estimation value so as to carry out a decode process on a second channel reception signal received from the base station apparatus in use of the decoding result of the first channel reception channel, said apparatus including a retransmission control function for carrying out said decode process in use of the second channel reception signal and a retransmission signal of the reception signal, said method comprising:
    a channel compensating step for carrying out a channel compensation process on said first channel reception signal in use of the channel estimation value obtained for said first channel reception signal based on a plurality of known signals received from the base station apparatus; and
    a channel re-compensating step for carrying out the channel compensation process of said first channel reception signal again with said channel estimation value of said first channel reception signal obtained based on a plurality of known signals including at least a known signal which is received after reception of said first channel reception signal when a decoding result of said first channel reception signal after the channel compensation process in the channel compensating step is defined as an error.

10. The method of channel compensation in a mobile terminal apparatus according to claim 9, further comprising:
a channel estimating step for obtaining the channel estimation value of said first channel reception signal in use of said plurality of known signals; and
a delaying step for delaying said first channel reception signal so as to include a known signal received after the reception of said first channel reception signal for the channel compensation into said plurality of known signals
wherein, in the channel re-compensating step, said re-compensation process is carried out by receiving the channel estimation value obtained in the channel estimating step in parallel with said first channel reception signal delayed in the delaying step.

11. The method of channel compensation in a mobile terminal apparatus according to claim 9, further comprising:
a second channel decoding step for decoding said second channel reception signal in use of a decoding result when the result of decoding said first channel reception signal after the channel compensation process in the channel re-compensating step is not defined as an error; and
a retransmission control buffering step for buffering said second channel reception signal decoded in the second channel decoding step in preparation for executing said retransmission control function.

12. The method of channel compensation in a mobile terminal apparatus according to claim 10, further comprising:
a second channel decoding step for decoding said second channel reception signal in use of a decoding result when the result of decoding said first channel reception signal after the channel compensation process in the channel re-compensating step is not defined as an error; and
a retransmission control buffering step for buffering said second channel reception signal decoded in the second channel decoding step in preparation for executing said retransmission control function.

13. The method of channel compensation in a mobile terminal apparatus according to claim 9, further comprising:
notifying an error to the base station apparatus when the result of decoding said first channel reception signal after the channel compensation performed again in the channel re-compensating step is defined as an error.

14. The method of channel compensation in a mobile terminal apparatus according to claim 9, further comprising:
notifying normality or abnormality in the decoding result to the base station apparatus when the decode process in the second channel decoding step is completed within a predetermined time which is regulated from a completion of receiving said second channel reception signal to a completion of decoding the second channel reception signal.

15. The method of channel compensation in a mobile terminal apparatus according to claim 14, further comprising:
notifying abnormality to the base station apparatus as a result of said decode process when the decode process in the second channel decoding step is not completed within said predetermined time.

16. The method of channel compensation in a mobile terminal apparatus according to claim 9,
wherein said first channel is an HS-SCCH (High Speed-Shared Control Channel) of an HSDPA (High Speed Downlink Packet Access) system and said second channel is an HS-PDCH (High Speed-Physical Downlink Shared Channel) of said HSDPA system.

* * * * *